United States Patent
Erpelding, Jr.

[15] 3,688,294
[45] Aug. 29, 1972

[54] DISPLAY ANNUNCIATOR USING SCR MEMORY AND DIGITAL LOGIC CIRCUITRY

[72] Inventor: William J. Erpelding, Jr., Creve Coeur, Mo.

[73] Assignee: Monsanto Company, St. Louis, Mo.

[22] Filed: June 1, 1970

[21] Appl. No.: 42,216

[52] U.S. Cl..............................340/213.1, 340/415
[51] Int. Cl.............................................G08b 21/00
[58] Field of Search..........................340/213.1, 415

[56] References Cited

UNITED STATES PATENTS

| | | |
|---|---|---|
| 3,193,814 | 7/1965 | Foster......................340/213.1 |
| 3,447,145 | 5/1969 | Schumann...............340/213.1 |
| 3,456,251 | 7/1969 | Smith.......................340/213.1 |
| 3,525,988 | 8/1970 | Linder.....................340/213.1 |
| 3,550,121 | 12/1970 | Porter......................340/213.1 |

*Primary Examiner*—Thomas B. Habecker
*Attorney*—J. D. Upham, H. R. Patton and W. J. Bethurum

[57] ABSTRACT

Alarm annunciator circuitry comprising input digital logic gates for selectively controlling the conductivity of an SCR bistable memory element. Output digital logic gates are connected to and controlled by both the SCR and the input logic gates to provide both constant DC and periodically varying output control potentials for driving a lamp display portion of the alarm annunciator circuitry.

4 Claims, 2 Drawing Figures

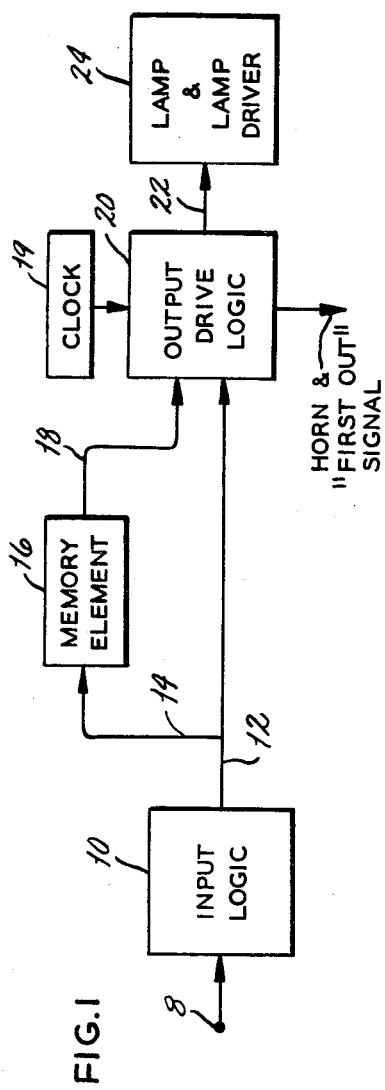
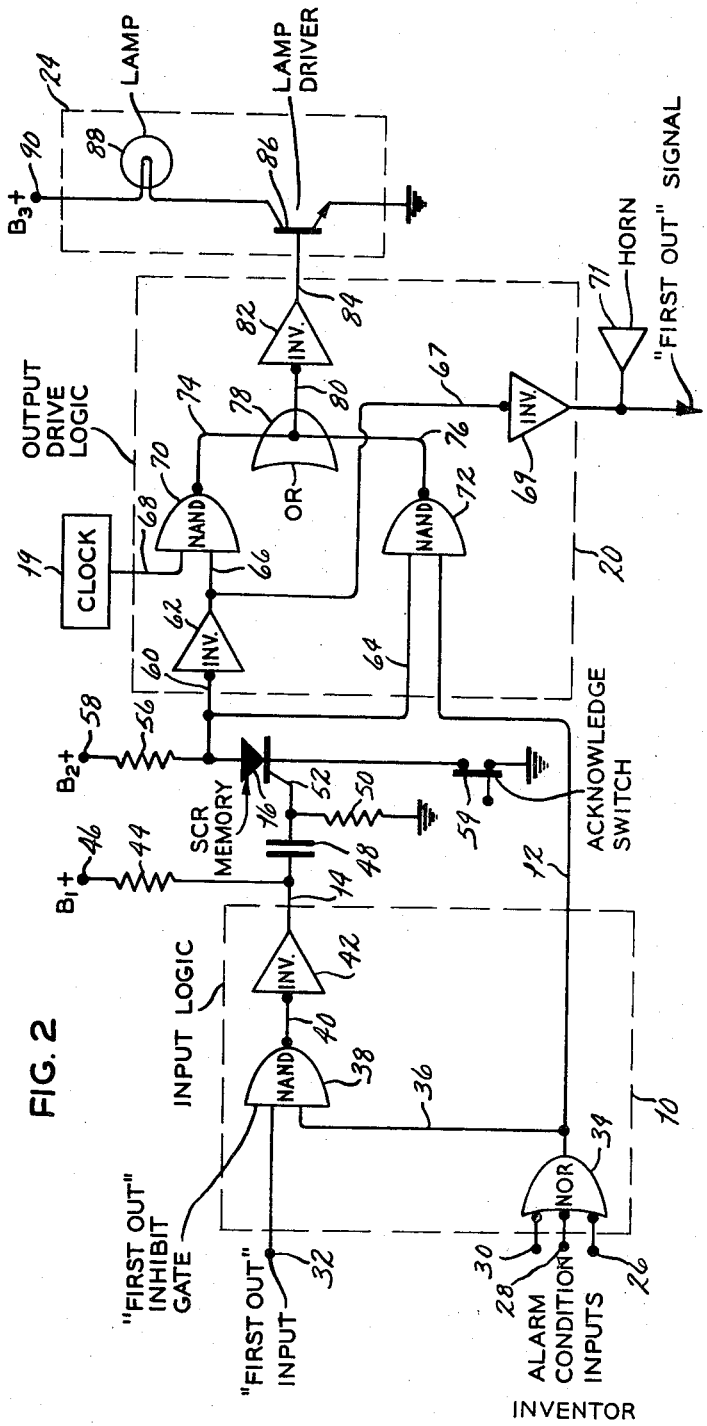

3,688,294

DISPLAY ANNUNCIATOR USING SCR MEMORY AND DIGITAL LOGIC CIRCUITRY

FIELD OF THE INVENTION

The present invention relates generally to electronic alarm annunciator circuitry responsive to the occurrence of abnormal conditions, and more particularly to solid-state circuitry which, until operator acknowledgement is made, will provide an intermittent or continuously varying visible and/or audible indication of such abnormal conditions. Additionally, the invention pertains to circuitry which, after operator acknowledgement, will provide a visible indication different from that prior to acknowledgement and maintain such indication until the detected abnormal condition has been corrected.

BACKGROUND OF THE INVENTION

Alarm annunciators have found wide application in process control and other supervised systems wherein a multiplicity of remote plant conditions are monitored and an alarm indication provided at a central station or control room should any of the conditions become abnormal. In such applications, it is desirable that the alarm annunciator is characterized by an attention attracting mode of operation, such as a flashing or intermittently occurring indication which will attract the attention of the control room operator. After the operator has noted the occurrence of the abnormal condition, he may acknowledge it by terminating the intermittent operation of the annunciator and initiating a steady state or other indication condition noticeably different from the attention attracting mode of operation. This steady state operation then prevails until the abnormal condition has been corrected.

DESCRIPTION OF THE PRIOR ART

Heretofore, alarm annunciators of the above-described type have employed bistable memory elements, such as silicon controlled rectifiers (SCR's), and these SCR's have been used to perform a variety of switching functions in the alarm annunciator circuitry. For example, SCR's have been connected to receive an energizing control potential indicative of a given abnormal condition of a process being controlled, and in response thereto switch from a nonconductive to a conductive state to thereby energize a lamp in the display portion of the annunciator circuitry. However, in the known prior art alarm annunciator circuits utilizing SCR's: (1) either separate lamp-SCR combinations were required for the intermittent and continuous alarm indications, respectively; (2) or in the alternative, separate lamps were driven by a single SCR for providing the flashing and steady state alarm indications in the display portion of the alarm annunciator circuitry. In neither case above was it possible to utilize a single SCR and a single lamp in a circuit combination capable of providing both the steady state and intermittent alarm indications for process control or other supervised systems.

SUMMARY OF THE INVENTION

The general purpose of this invention is to provide a solid state alarm annunciator circuit which possesses the advantages of similarly employed alarm annunciators and yet does not possess the aforesaid disadvantages. To attain this, the present invention utilizes a unique circuit combination of a three terminal current controlled device, such as a silicon controlled rectifier, together with input and output digital logic circuitry. In this novel circuit combination, a single control device, such as an SCR, and a single lamp may be used to provide both continuous and intermittently flashing alarm indications in the alarm annunciator circuitry. Therefore, an object of the present invention is to provide a new and improved inexpensive solid-state alarm annunciator capable of providing sustained intermittent or steady-state visible or audible alarm indications.

Another object of this invention is to provide a new and improved alarm annunciator which may be first triggered by an abnormal condition to an intermittent operating state, and then switched to a steady acknowledgement state by an operator and maintained in a steady-state mode until the abnormal condition has been corrected.

Still another object of the present invention is to provide multiple alarm indications in an alarm annunciator circuit which utilizes, inter alia, only a single bistable device and a single lamp.

BRIEF DESCRIPTION OF THE INVENTION

The above objects of the present invention are achieved by providing alarm annunciator circuitry including a three terminal, solid-state unidirectional current controlled device, such as a silicon controlled rectifier (SCR). The SCR is conductively controlled by input logic circuitry which receives an alarm switching signal, and the SCR is further connected to output drive logic circuitry in such a manner that the conductive state of the single SCR controls both the intermittent flashing and constant level lighting of a single lamp in the display portion of the annunciator circuitry. A first gating means in the output drive logic circuitry responds to both clock and SCR output signals to provide a periodic control potential in the display portion of the annunciator. A second gate means within the output drive logic circuitry responds to both input logic circuit and SCR output signals to provide a steady state control potential to the display portion of the alarm annunciator. Thus, in both its conductive and nonconductive condition, the SCR controls an alarm indicating lamp in the display portion of the annunciator. Advantageously, an acknowledge switch is connected between the SCR cathode and a point of reference potential, and this switch may be used to acknowledge an initial alarm condition for multiple SCR's, each in a different channel having the same or similar alarm annunciator circuit to be further described.

The above brief description as well as the objects and features of this invention will become more fully apparent in the following description of the accompanying drawings.

DRAWINGS

FIG. 1 is a block diagram representation of an embodiment of the present invention, and FIG. 2 is a circuit diagram of the invention corresponding to FIG. 1. FIG. 2 is partially schematic and partially functional in form, and like reference numerals have been used in FIGS. 1 and 2 to designate corresponding portions of these two figures.
DETAILED DESCRIPTION OF THE INVENTION Referring to FIGS. 1 and 2 in detail, there is shown input logic circuitry 10 for receiving one or more alarm input signals on the input connection designated generally as $8B_1$ and responsive thereto to generate an output logic signal which is applied both as an input signal via conductor 14 to a memory element 16 and also as one input to the output drive logic circuitry 20. The output drive logic circuitry 20 includes first and second gate means to be described in more detail below with reference to FIG. 2. The first gate means is responsive to a signal from the SCR memory element 16 for generating a first control potential on output conductor 22. This first, periodic control potential provides an intermittent flashing control of the lamp and lamp driver display circuitry 24, with the flashing frequency being controlled by the free running clock 19. After acknowledgement of the alarm condition indicated by the intermittent flashing of a lamp in the display circuitry 24, the combination of the potentials then existing on conductors 12 and 18 and applied to a second gate means within the output drive logic circuitry 20 generates a second control potential on output conductor 22. This second control potential is applied to the input of the lamp and lamp driver 24 as a steady state bias voltage for energizing the lamp and lamp driver circuitry 24 as long as the alarm condition exists.

Referring in detail to FIG. 2, the alarm circuit input connection designated generally as 8 in FIG. 1 above takes the form of a plurality of alarm condition inputs 26, 28 and 30 which are connected to a NOR input gate 34 within the input logic circuitry 10. The output of the NOR input gate 34 is connected via conductor 36 to one input terminal or connection of a NAND inhibit gate 38 whose other input terminal is connected to a "first out" input terminal 32. A "first out" inhibit signal which is applied to terminal 32 will be described further below. The output terminal of the NAND inhibit gate 38 is connected via conductor 40 to the input of an inverter 42, and the output of inverter 42 is connected through a coupling capacitor 48 to the control or gate electrode 52 of the SCR memory element 16. Capacitor charge resistor 44 coupling capacitor 48 and "pull down" resistor 50 provide the necessary coupling between the inverter 42 and the SCR memory 16 to fire the SCR memory 16 when an inverter 42 output logic pulse is present on conductor 14.

The output or anode of the SCR memory element 16 is connected through conductor 60 to the input of an inverter 62 and through conductor 64 to one input of NAND gate 72. The output of the inverter 62 is connected via conductor 66 to one input of NAND gate 70, and the NAND gates 70 and 72 will be referred to herein, respectively, as first and second NAND gates within the output drive logic circuitry 20. The first NAND gate 70 has its other input connected via conductor 65 to the clock 19 as shown, and the other input of the second NAND gate 72 is directly connected back via conductor 12 to the output of the NOR input gate 34. The outputs of both the first and second NAND gates 70 and 72 are connected to inputs of a so-called "wired" OR gate 78 whose output conductor 80 is connected to the input of an inverter 82. In this "OR" gate 78, the conductors 74 and 76 are electrically connected.

The output signal from inverter 82 is either one or the other of two control potentials which are applied to that base of lamp driver NPN transistor 86. The control potential on conductor 84 provides the control bias for NPN transistor 86 to interconnect the lamp 88 in series with the collector-emitter path of NPN transistor 86 between the $B_3+$ supply terminal 90 and ground potential.

The inverter 62 is further connected via conductor 67 to another inverter 69 and the output signal from inverter 69 is used to drive a horn 71 and used as a "first out" signal. This "first out" signal is further processed through additional circuitry (not shown) before being returned to input terminal 32 of inhibit NAND gate 38. This "first out" signal inhibits similar NAND gates (38) in other adjacent annunciator channels in order to prevent these other channels from responding by intermittent flashing to alarm conditions simultaneously with the flashing response of the alarm annunciator shown in FIG. 2. This "first out" operation is generally well-known in the art of process control and will be described in more detail below.

OPERATION

Assume now that some abnormal condition has been caused in the process being monitored, and that the existence of such abnormal condition produces, by well-known process control transducer action, a "low" input signal condition at one of the input terminals 26, 28 and 30 of NOR input gate 34. For the purpose of explaining the operation of FIG. 2, positive logic is used, and the terms "low" and "high" refer to low and high levels of digital logic signals. Prior to such abnormal condition, all of the inputs 26, 28 and 30 of the NOR input gate 34 were at a "high" logical level, and thus the output potential of NOR input gate 34 on conductor 12 and 36 was at a "low" logical level. However, when one or more of the input terminals 26, 28 and 30 is switched from a high logical level to a low logical level, then the output potential of the NOR input gate 34 swings from its low logical level to its high logical level. The low logical level used in a circuit of the type shown in FIG. 2 which was actually built and operated was zero volts and the high logical level used therein was 5 volts. The $B_1+$ and the $B_2+$ supply voltages were both 5 volts, and the $B_3+$ supply was 45 volts. However, it will be understood by those skilled in the art that these low and high DC levels are only typical logical levels for the digital circuitry embodying the present invention and impose no limitation on the true scope of this invention.

When the potential on conductor 36 swings high, and when the "first out" input terminal 32 is high prior to the conduction of the SCR memory element 16, the inhibit NAND gate 38 is now presented with a high potential on both of its input conductors. For this input signal condition at NAND gate 38, the output of NAND gate 38 swings low, and this low potential is inverted to a high potential by the inverter 42 before being coupled through a coupling capacitor 48 to the gate electrode 52 of the SCR 16. This positive going signal turns on the SCR memory element 16, and the anode of the SCR 16 swings from a high logical level to a low logical level due to the IR drop across anode load resistor 56. This low anode voltage level on conductor 60 is converted to a high logical level by inverter 62 and is then "clocked" through a first NAND gate 70 by a source of periodic clock signals from the free-running clock source 19. The periodic, square-wave control pulse output from the first NAND gate 70 is passed by the wired OR gate 78 and coupled through inverter 82 into the base of the lamp driver NPN transistor 86. In this manner, this clocked, first control potential is utilized to switch the lamp driver transistor 86 on and off at the frequency of the clock source 19. Thus, for an initial indication of an abnormal condition in the process being controlled, the lamp 88 will continue to flash on and off at a repetition rate determined by the frequency of clock source 19.

The high logic potential now on conductor 67 is coupled through inverter 69 and may be utilized to energize a horn 71 if desired. Additionally, the inverted or low logic potential at the output of inverter 69 is further processed and then utilized as previously mentioned to inhibit NAND gates (not shown) similar or identical to NAND gate 38 in other adjacent annunciator channels. This inhibit signal prevents other "inhibit" NAND gates from initiating a lamp flashing condition in other similar adjacent channels as long as lamp 88 in FIG. 2 is flashing. In this manner, the single flashing lamp 88 in the control room will indicate to an operator the first abnormal condition of a process to occur, and all other subsequent and different abnormal conditions will be indicated by lamps (not shown) in other adjacent channels which are switched to their steady state or continuous "on" condition. That is, if an alarm signal (low input) is present on one of the inputs 26, 28 or 30 to NOR input gate 34 in an adjacent channel (not shown) then both input conductors 12 and 64 to NAND gate 72 will cause a lamp 88 in an adjacent channel to be driven continuously "on" as will be further explained below.

The control room operater will now acknowledge the above-described alarm condition by opening the acknowledge switch 54 in the cathode circuit of the SCR memory element 16. When this occurs, the anode of the SCR 16 will swing back to its high logical $B_3+$ level and will now present the second NAND gate 72 in the output drive logic circuitry 20 with an "all high" condition if the abnormal condition of the process being monitored still exists (i.e. the potential on conductor 12 is still high). For the latter condition, the output potential of the second NAND gate 72 will swing to its low logical level and be coupled through wired OR gate 78 and via conductor 80 to the input of the inverter 82. The resulting high output logical level at the output of the inverter 82 is a steady state high control potential at the base of NPN transistor 86 which biases the transistor 86 conducting as long as both inputs to the second NAND gates 72 are high. Thus, by the use of this input and output digital logic circuitry 10 and 20 previously described, it is possible to control a single lamp driver transistor 86 and a single lamp 88 by a single SCR memory element 16. The lamp 88 provides an intermittent or periodic flashing to indicate an initial abnormal condition in the process being monitored, and then subsequently provides a steady state illumination indicating the continued existence of the abnormal condition in the process after acknowledgement.

If the abnormal condition is corrected during the intermittent flashing of lamp 88 and before acknowledgement, then the regenerative bistable nature of SCR 16 will cause SCR 16 to remain conducting; thus, lamp 88 will continue to flash until the acknowledge switch 54 is opened. That is, the SCR memory element 16 will remain on after it is once fired by a control potential on control electrode 52 regardless of the subsequent change in logic potential at the output of the NOR input gate 34. However, once the acknowledge switch 54 has been opened and the abnormal condition in the process has been corrected, then the logic potentials on input conductors 66 and 12 to the first and second NAND gates 70 and 72 will be low. With these NAND gates 70 and 72 thus disabled, the lamp driver transistor 86 and the lamp 88 are deenergized.

The present invention may be practiced other than as specifically described above with reference to FIG. 2. For example, it is possible to modify the particular gate connections in the input logic and output drive logic circuitry of FIG. 2 without departing from the scope of this invention. It will be obvious to those skilled in the art that the output or anode electrode of the SCR memory element 16 may be clocked through various types of digital logic gates to the input or base of a lamp driver transistor 86. For example, one such circuit modification (not shown) could include a clock channel (for flashing) wherein a low clock signal and a low SCR 16 anode signal are first coupled through a NOR gate whose high output is inverted before being applied as one input to a NOR output gate. A second channel (for steady state operation) could include a NAND gate responsive to a high SCR anode signal and a high logic potential (fault signal) on conductor 12 to provide a low output logic potential which serves as another input to a 2 input NOR output gate. With either of the two inputs to this NOR output gate at a low logic potential, the output signal of this NOR output gate swings to a high logic potential which, in turn, can be used to drive the lamp driver transistor 86.

Additionally, the circuit of FIG. 2 may, if desired, be operated without the "first out" inhibit operation as previously described, and for such modification of this invention, the output signal on conductor 12 may be directly coupled through capacitor 58 to the gate 52 of the SCR memory element 16.

I claim:

1. Alarm annunciator circuitry including therein a triggerable memory element, the quiescent and alarm output signal conditions of which are alternately utilized to control the conductive state of alarm indicating means, said circuitry including, in combination:
    a. an input logic gate means for receiving one or more alarm input signals and responsive thereto to provide an output signal, means coupling said input logic gate means to said memory element for triggering same to said alarm signal condition,
    b. a first output logic gate means connected to an output node of said memory element and responsive to said alarm signal condition thereat for providing an output signal which controls the conductivity of said alarm indicating means, and
    c. a second output logic gate means, said second output logic gate means having at least two inputs, one of said inputs being connected to the output node of said triggerable memory element and the other of said inputs connected to said first input logic gate means, said second output logic gate means responsive to both said quiescent output signal condition at said output node of said triggerable memory element and said output signal from said input logic gate means to provide an output signal which controls the conductivity of said alarm indicating means, whereby if an alarm signal is present at said input logic gate means, said alarm indicating means is energized.

2. The combination defined in claim 1 wherein said first and second output logic gates means are coupled to a further, common output logic gate means, the output signal of which controls the energization of said alarm indicating means.

3. The combination defined in claim 1 wherein said coupling means is inhibiting logic means, whereby said memory element may be additionally controlled by inhibiting signals from associated alarm annunciator circuitry.

4. The combination defined in claim 1 wherein said memory element is a silicon controlled rectifier having the anode thereof directly coupled to both said first and second output logic gate means to control the transmission of signals therethrough, said silicon controlled rectifier further having its cathode connected through an acknowledge switch which is operative to open the cathode circuit of said silicon controlled rectifier and terminate conduction therein.

* * * * *